United States Patent
Saberian et al.

(10) Patent No.: US 9,805,305 B2
(45) Date of Patent: Oct. 31, 2017

(54) BOOSTED DEEP CONVOLUTIONAL NEURAL NETWORKS (CNNS)

(71) Applicant: Yahoo Holdings, Inc., Sunnyvale, CA (US)

(72) Inventors: Mohammad Saberian, Sunnyvale, CA (US); Jia Li, Santa Clara, CA (US); Jian Yang, Palo Alto, CA (US)

(73) Assignee: Yahoo Holdings, Inc., Sunnyvale, CA (US)

(*) Notice: Subject to any disclaimer, the term of this patent is extended or adjusted under 35 U.S.C. 154(b) by 0 days.

(21) Appl. No.: 14/820,972

(22) Filed: Aug. 7, 2015

(65) Prior Publication Data

US 2017/0039456 A1   Feb. 9, 2017

(51) Int. Cl.
*G06K 9/00* (2006.01)
*G06N 3/08* (2006.01)

(52) U.S. Cl.
CPC .................................... *G06N 3/08* (2013.01)

(58) Field of Classification Search
CPC ........... G06K 9/66; G06N 3/0454; G06N 3/08
USPC .................................................. 382/156–159
See application file for complete search history.

(56) References Cited

U.S. PATENT DOCUMENTS

2006/0110040 A1* 5/2006 Simard .............. G06K 9/00422
                                                                 382/181
2016/0019459 A1* 1/2016 Audhkhasi .......... G06K 9/6217
                                                                 706/22

OTHER PUBLICATIONS

Li, et al. (Highly Efficient Forward and backward Propagation of Convolutional Neural Networks for Pixelwise Classification), pp. 1-10, Dec. 2014.*
Becker, et al. (KernelBoost: Supervised Learning of Image Features for Classification), pp. 1-16, Feb. 2013.*
Masci, et a. (A Fat Algorithm for Image Segmentation with Max-Pooling Convolution Networks), pp. 1-5, Feb. 2013.*
Lin, "Fast Training of Effective Multi-class Boosting Using Coordinate Descent Optimization," Published in Proc. 11th Asian Conference on Computer Vision, Korea, 2012, 15 Pages.
Zhu, "Multi-class AdaBoost," https://www.google.com/search?q=multi-class+adaboost&ie=utf-8&oe=utf-8, 2006, 21 Pages.
Viola, "The Viola/Jones Face Detector," CVPR, 2001, 34 Pages.
Ciresan, "A Committee of Neural Networks for Traffic Sign Classification," http://people.idsia.ch/~juergen/ijcnn2011.pdf, 2011, 4 Pages.
Freund, "A Short Introduction to Boosting," Journal of Japanese Society for Artificial Intelligence, 14(5): 771-780, Sep. 1999, 14 Pages.

* cited by examiner

*Primary Examiner* — Daniel Mariam
(74) *Attorney, Agent, or Firm* — Berkeley Law & Technology Group, LLP (57) ABSTRACT

Briefly, embodiments of methods and/or systems of training multiclass convolutional neural networks (CNNs) are disclosed. For one embodiment, as an example, an auxiliary CNN may be utilized to form an ensemble with the collection as a linear combination. The linear combination may be based, at least in part, on boost prediction error encountered during the training process.

20 Claims, 3 Drawing Sheets

BOOSTED DEEP CONVOLUTIONAL NEURAL NETWORKS (CNNS)

BACKGROUND

1. Field

The present disclosure relates generally to training and/or configuring a neural network, such as a convolutional neural network (CNN).

2. Information

A neural network may be utilized for a variety of tasks, including computer vision tasks, such as image recognition and/or image classification, for example. However, building a neural network may involve complicated trial-and-error tasks, in which tens of millions of parameters, for example, may be generated and/or modified over an extensive period of time, such as several days, weeks, or longer. Additionally, training a neural network may entail supplying numerous training samples, such as captured digital image files, which may number into tens of millions, for example. Further, in some instances, a chosen neural network architecture, while suitable for particular applications, may be overly cumbersome or unwieldy if utilized for other applications. Selection of a neural network that is otherwise too complex for an application, for example, may unnecessarily increase processing and other resources which may be involved in implementation.

BRIEF DESCRIPTION OF DRAWINGS

Claimed subject matter is particularly pointed and/or distinctly claimed in the concluding portion of the specification. However, both as to organization and/or method of operation, together with objects, claimed features, and/or advantages thereof, claimed subject matter may be understood by reference to the following detailed description if read with the accompanying drawings in which:

Reference is made in the following detailed description of the accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples or processing portions of a neural network, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system is the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. For example, reduce operation and/or similar terms refer to processing of signals via a summary operation (e.g., such as counting the number of students in a queue, yielding name frequencies). For example, a system may employ such an architecture for processing by marshalling distributed servers, running various tasks in parallel, managing communications and/or signal transfers between various parts of a neural network, in an embodiment. (See, for example Jeffrey Dean et al. "Large Scale Distributed Deep Networks," Advances in Neural Information Processing Systems 25, 2012, pp. 1232-1240.) As mentioned, one non-limiting, but well-known example, is the Hadoop distributed computing system, which refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

It should be understood that for ease of description, a network device (also referred to as a networking device) may be embodied and/or described in terms of a computing device. However, it should further be understood that this description should in no way be construed to imply or suggest that claimed subject matter is limited to one embodiment, such as a computing device and/or a network device, and, instead, may be embodied as a variety of devices or combinations thereof, including, for example, one or more illustrative examples.

Likewise, in this context, the terms "coupled," "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The terms, "and," "or," "and/or" and/or similar terms, as used herein, include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, subnetworks, such as may employ differing architectures and/or may be compliant and/or compatible with differing protocols, such as computing and/or communication protocols (e.g., network protocols), may interoperate within a larger network. In this context, the term "sub-network" and/or similar terms, if used, for example, with respect to a network, refers to the network and/or a part thereof. Subnetworks may also comprise links, such as physical links, connecting and/or coupling nodes so as to be capable of transmitting signal packets and/or frames between devices of particular nodes including wired links, wireless links, or combinations thereof. Various types of devices, such as network devices and/or computing devices, may be made available so that device interoperability is enabled and/or, in at least some instances, may be transparent to the devices. In this context, the term "transparent" refers to devices, such as network devices and/or computing devices, communicating via a network in which the devices may be capable of communicating via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for rerouting and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network comprising a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but such devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term "Internet Protocol," "IP," and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term "World Wide Web" ("WWW" or "Web") and/or similar terms may also be used, although it refers to a part of the Internet that complies with the Hypertext Transfer Protocol (HTTP). For example, network devices may engage in an HTTP session through an exchange of appropriately compatible and/or compliant signal packets and/or frames. It is noted that there are several versions of the Hypertext Transfer Protocol. Here, the term "Hypertext Transfer Protocol," "HTTP," and/or similar terms is intended to refer to any version, now known and/or later developed. It is likewise noted that in various places in this document, substitution of the term "Internet" with the term "World Wide Web" ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, digital image, a contiguous portion of a digital image, just to name a few examples. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms, refer to any electronic file and/or electronic document, such as an electronic digital image, and/or a contiguous portion of an electronic digital image, such as may be accessible via a network, including by specifying a URL for accessibility via the Web, for example. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "train," "digital image," "captured image," "electronic document," "content," and/or similar terms are meant to refer to signals and/or states in a physical format, such as a digital signal and/or digital state format, e.g., that may be perceived by a user if displayed, played, and/or otherwise executed by a device, such as a digital device, including, for example, a computing device, but otherwise might not necessarily be perceivable by humans (e.g., in a digital format). In another embodiment, a digital image or captured image may comprise a portion or a region of a Web page, a portion, such as a contiguous portion, of an image captured using a digital camera. However, claimed subject matter is not intended to be limited in these respects. Also, for one or more embodiments, a captured image and/or digital image may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or a contiguous portion of a digital image, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, and exist in the form of physical signals and/or physical states, such as memory states. For example, one or more parameters, such as parameters of a neural network, may comprise signal samples utilized in a convolutional filter, signal samples utilized in one or more kernel masks, response normalization of output signal samples of one or more neurons of a neural network, neuron weighting value levels, size of filters, number of filters, and so forth. Claimed subject matter is intended to embrace meaningful, descriptive parameters in any format, so long as the one or more parameters comprise physical signals.

Signal packets and/or frames, also referred to as signal packet transmissions and/or signal frame transmissions, may be communicated between nodes of a network, and/or among neurons of a neural network, in which a node may comprise one or more network devices and/or one or more computing devices, for example. As an illustrative example, but without limitation, a node may comprise one or more sites employing a local network address. Likewise, a device, such as a network device and/or a computing device, may be associated with a computing node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame in accordance with a target and/or destination address and availability of a network path of network nodes to the target and/or destination address. Although the Internet and/or the Web comprises a network of interoperable networks, not all of those interoperable networks are necessarily available and/or accessible to the public. A computing network may be very large, such as comprising thousands of nodes, millions of nodes, billions of nodes, or more, as examples.

Media networks, such as the Yahoo!™ network, for example, may be increasingly seeking ways to attract users to their networks and/or to retain users within their networks for extended periods of time. A media network may, for example, comprise an Internet Web site and/or group of Web sites having one or more sections. For instance, the Yahoo!™ network includes Web sites located within different categorized sections, such as sports, finance, current events, and/or games, to name just a few non-limiting examples among a variety of possible examples. To attract and/or retain users within its network, Yahoo!™ and/or other media networks may continually strive to provide content relating to categorized sections that may be interesting and/or of use to users.

In an implementation, a user may beneficially interact with a media network to search for images, and/or to determine a measure of favorability (or preference) of one or more images. In this context, an image classifier may assist a user in finding images comprising a measure of favorability or preference with respect to other images. Thus, in this context, a measure of favorability or preference of an image refers to a degree to which viewing an image elicits a feeling or emotion of approval and/or fondness with respect to the image on the part of the person(s) viewing the image. Thus, an image that elicits approval or appeal may, for example, indicate an image comprising a relatively higher or more positive measure of favorability or preference. Likewise, an image that elicits disapproval or revulsion may indicate an image comprising, for example, a relatively low or more negative measure of favorability or preference. Images that do not elicit or bring about feelings of approval or disapproval may, for example, indicate an image comprising a relatively neutral measure of favorability or preference. Favorability or preference may influence whether a user posts, for example, an image, or portion thereof, on a user's blog, social network page, etc. (e.g., Tumblr, Flickr, and so forth).

In other implementations, a media network may utilize an image classifier to provide assistance to users, such as social network users, who may wish to find favorable images for a variety of purposes, such as to assist in viral marketing, for example. A user may wish to search for captured images that meet particular search criteria, such as images that may be perceived as favorable with respect to other images. Accordingly, in these examples and others, a capability to provide images with a higher degree of favorability or preference with respect to other images may be useful in supplying relevant content to satisfy a number of potential user desires. In this context, "image classification," which may assist in determining whether an image may be favored with respect to another image, refer to a processor-implemented capability (e.g., without particular or customized human interactions). To interpret an image, such as a digital image, and to select a category of entities and/or a category of preference or favorability, to which an image may belong. In an embodiment, selection of a category in an image classifier may be based, at least in part, on extraction of structural features, colors, contexts, scale, and/or other discriminators to assist in recognizing objects visible within one or more portions of the image, for example.

In this context, a "classifier," such as an image classifier, refers to processing, such as using one or more computer processors, which performs an image classification operation. In embodiments, a classifier may utilize, for example, keypoints of an image, image descriptors, histograms of colors rendered in an image, spatial filtering of one or more portions of an image, and/or other image analysis approaches to bring about a capability for a computer, and/or a similarly equipped device, to select a category of entities to which an image may belong, for example. In embodiments, a classifier, such as a binary classifier (e.g., a classifier to classify elements of a given set as belonging to one of two groups), a multiclass classifier (e.g., a classifier to classify elements of a given set as belonging to one of three or more groups), or other type of classifier, may be implemented to generate image recognition and/or image classification.

However, training of an image classifier with may involve a cumbersome process. Thus, an approach to reducing human involvement in an image classifier training process may also be desirable. Typically, training a multiclass classifier, such as a machine learning classifier (which may comprise, for example, a support vector machine (SVM)), for example, to generate a measure of favorability, for example, and/or to provide images corresponding to terms of a search query, in general, may be complex and/or time intensive. In some instances, measurements (e.g., of image classification) for a large sample of digital content in the form of captured digital images, for example, may be employed. Ground truth may also typically be employed, meaning verification using a sample set in which it is believed that reasonably correct measurement (e.g., accurate image classification) exists. Thus, typically in addition to time and cost, extensive computational and/or memory resources may be consumed in connection with implementation and/or validation of, for example, an image classifier.

An image classifier approach employing an eight-layer CNN utilizing a training set of millions of digital images is described by Krizhevsky et al, "ImageNet Classification with Deep Convolutional Neural Networks," Advances in Neural Information Processing Systems 25 (NIPS 2012). A CNN may involve, for example, five convolutional layers, which may perform convolution of an image using an image processing kernel, followed by three fully-connected layers in an arrangement in which one or more neurons of a first fully-connected layer may be coupled to one or more neurons of a second fully-connected layer so that signal samples processed by one layer are employed by subsequent processing layers. Terms such as "convolutional layer," "fully-connected layer," "neurons," "neural" etc., are described with ample clarity in the aforementioned paper.

However, as previously mentioned, for some situations, an eight-layer deep CNN may comprise an overly complicated and/or unwieldy network that may involve millions of training signal samples in the form of sample images to be utilized, such as during training iterations, for example. In some implementations, a single training iteration may, for example, consume several hours of processing time on a state-of-the-art computing device. Relatively lengthy training processes may lead to hundreds of hours of iterative training of a typical CNN.

On the other hand, at least in some embodiments, CNN architectures involving an "ensemble" (e.g., two or more) of "weak" learners may provide a capability that meets, or possibly exceeds, capabilities of larger and/or more complex neural networks, such as eight-layer CNNs or neural networks comprising a larger number of layers, for example. In this context, a "weak" learner refers to a classifier that, at best, provides output signal samples values slightly correlated with an accurate classification. Thus, in particular embodiments, as a non-limiting illustration, a weak learner may comprise a CNN exhibiting a correlation coefficient of, for example, values of less than a range of approximately 0.25 to approximately 0.10 or even less. However, in certain embodiments, although a neural network may exhibit a comparatively low correlation (e.g., less than a range of approximately 0.25 to approximately 0.10) a neural network may be trained via "boosting" utilizing an "auxiliary" neural network. In this context, an "auxiliary" neural network refers to a neural network utilized to train and/or "boost" a neural network by storing boosting weights and/or providing access to stored boosting weights. In this context, "boosting" refers to an iterative process of utilizing output signal sample values from a plurality of CNNs, in which individual CNNs operating in relative seclusion from one another tend to exhibit weaker learning; however, if combined, form an ensemble exhibiting stronger learning capabilities. In embodiments, training, utilizing for example comparison of output signal samples with ground truth and/or computing of boosting weights of individual CNNs, may permit an ensemble of neural networks to boost correlation with an accurate classification, such as correlations in the range of approximately 0.85 to approximately 0.95, for example, or greater.

In embodiments, training to boost a neural network may also involve augmenting of a size of signal samples in the form of captured digital images, which may serve to enlarge a training set of images. In this context, augmentation refers to modifying one or more aspects of an image without altering one or more fundamental properties of an image. Accordingly, augmenting may comprise cropping of a digital image, injection of random/pseudorandom noise into a digital image, distortion of a digital image, modification of hue and/or color of a digital image, or any combination thereof, without invalidating one or more of the more basic properties of a digital image. Thus, for example, an image of a house cat may be augmented utilizing one or more of the above-identified processes but without, for example, removing or obscuring one or more portions of the image that includes a recognizable image (or images) of a house cat. In certain embodiments, augmenting may increase size of an available training set of digital images by approximately 1000 to approximately 3000, for example. However, in particular embodiments, augmenting may increase a size of an available training set of digital images by less than approximately 1000, such as 250, 500, etc., or may increase the size of an available training set by amounts greater than approximately 3000, such as approximately 3500, for example. In particular embodiments, augmentation of digital images may be performed in a manner so that boosting does not result in overfitting in which case, for example, a statistical model may not adequately describe an underlying relationship among variables of a given statistical model.

In embodiments, multiclass boosting may be described and/or understood as a class label mapping (F) of a signal sample $(x_i)$ to a class label $(z_i)$ as given in the expression below:

$$\mathcal{F}: X \to \{1, \ldots, M\}$$

$$z_i \in 1, \ldots, M$$

For example, a mapping (F) a signal sample $(x_i)$ to a class label $(z_i)$ may be shown by way of an embodiment, such as outlined in process embodiment 1 (described hereinbelow). In general, a typical class label mapping may not necessarily comprise a continuous mapping, such as from a continuous signal or set of continuous signals. However, classifier F(x) may be trained through use of a predictor expression $f: X \to \mathbb{R}^d$ for some d. In an embodiment, classifier F(x) may be implemented by:

$$F(x) = \operatorname*{argmax}_{k=1,\ldots M} \langle y_k, f(x) \rangle \quad (1)$$

In expression 1, $y_k$ may comprise a unit vector label of a $k^{th}$ class and $\langle yk, f(x) \rangle$ comprises the Euclidean dot product.

For example, in a binary classifier, labels may be set to $y_1=+1$ and $y_2=-1$ and expression 1 may comprise a classifier/decision approach F(x)=sign[f(x)]. In another possible example embodiment, such as a one-vs-all multiclass classifier, for a class k, a predictor $f_k(x): X \to \mathbb{R}$ may be trained to discriminate between signal samples of class k and one or more other classes. In embodiments, to classify a new example $\hat{x}$, $f_k(\hat{x})$ may be computed for all k=1, . . . , M and the class of largest predictor may be declared as the label. Such a process embodiment may be equivalent to expression 1 based, at least in part, on employing $f(x)=[f_1(x), \ldots, f_M(x)] \in \mathbb{R}^M$ and $y_k=1_k \in \mathbb{R}^M$ (e.g., $k^{th}$ element may be set to 1.0 and remaining terms may be set to 0.0). In general, a choice of labels are not intended to restrict a canonical basis in $\mathbb{R}^M$. Additionally, it is possible to utilize any set of M distinct vectors $y_1, \ldots, y_M \in \mathbb{R}^d$ in which, for example, d>2. For simplicity, however, in embodiments, it may be assumed that d=M and that $y_k=1_k$.

In embodiments, multiclass (as distinguished from binary class) boosting may be characterized as a method to combine two or more multiclass predictors $g_i: X \to \mathbb{R}^d$ to form an ensemble f(x) of multiclass classifiers (e.g., $f(x)=\Sigma_{t=1}^N \alpha_t g_t(x)$), in which $g_t$ and $\alpha_t$ comprise weak learners and $\alpha_t$ coefficients selected at a $t^{th}$ boosting iteration). In embodiments, several approaches may be utilized for multiclass boosting, such as process embodiment 1, provided in pseudocode below:

---
Sample Process Embodiment 1
---

Input Signal Sample Values: Number of classes M. Number of iterations N. Number of predictor dimension d. Codewords $\{y_1, \ldots, y_M\} \in \mathbb{R}^d$, and parameter set D = $\{(x_1,z_1), \ldots (x_n, z_n)\}$ where $z_i \in \{1, \ldots, M\}$ comprises a label of example $x_i$.
Initialization: Set t = 0 and f = 0 $\in \mathbb{R}^d$
while t < N do
    compute $w(x_i)$ for all $x_i$, using expression 6 (described below)
    find g(x), using expressions 7 and 8
    Update f(x) = f(x) + a*g*(x)
    Set t = t + 1
end while
Output Signal Sample Values: Decision rule: F(x) = arg $\max_k$
$\langle$ (f (x),yk$\rangle$

---

Referring to process embodiment 1, a boosted predictor f(x) may be trained using an objective function, for example, given by the expression below:

$$\mathcal{R}[f] = E_{x,z}\{L(z,f(x)))\} \approx \Sigma L(z_i, f(x_i)) \quad (2)$$

in which $$L(z_i, f(x_i)) = \sum_{j=1, j \neq z_i}^M e^{-\frac{1}{2}[\langle y_{z_i}, f(x_i) \rangle - \langle y_j, f(x_i) \rangle]} \quad (3)$$

To use gradient descent, process embodiment 1 may begin, for example, with $f(x)=0 \in \mathbb{R}^d \forall x$ and, in an iteration, compute a directional derivative of risk (or loss) in updating f(x) along the direction of g(x):

$$\delta\mathcal{R}[f; g] = \left.\frac{\partial \mathcal{R}[f + \epsilon g]}{\partial \epsilon}\right|_{\epsilon=0}$$

$$\delta\mathcal{R}[f; g] = \sum_{i=1}^n \left.\frac{\partial L(z_i, (f + \epsilon g)(x_i))}{\partial \epsilon}\right|_{\epsilon=0}$$

$$\delta\mathcal{R}[f; g] = \frac{1}{2}\sum_{i=1}^n \sum_{j=1, j \neq z_i}^M \langle g(x_i), y_j \rangle e^{-\frac{1}{2}\langle y_{z_i} - y_j, f(x_i) \rangle} -$$

$$\langle g(x_i), y_{z_i} \rangle \sum_{j=1, j \neq z_i}^M e^{-\frac{1}{2}\langle y_{z_i} - y_j, f(x_i) \rangle}$$

$$\delta\mathcal{R}[f; g] = -\frac{1}{2}\sum_{i=1}^n \sum_{j=1}^M \langle g(x_i), y_j \rangle w_j(x_i) \quad (4)$$

$$\delta\mathcal{R}[f; g] = -\frac{1}{2}\sum_{i=1}^n \sum_{j=1}^M g_j(x_i) w_j(x_i), \quad (5)$$

in which, it has been assumed that $y_j=1_j$, and $$w_k(x_i) = \begin{cases} -e^{-\frac{1}{2}[f_{z_i}(x_i)-f_{y_k}(x_i)]} & k \neq z_i \\ \sum_{j=1|j\neq k}^{M} -e^{-\frac{1}{2}[f_{z_i}(x_i)-f_{y_k}(x_i)]} & k \neq z_i \end{cases} \quad (6)$$

In embodiments, process embodiment 1 may select and train a weak learner, substantially in accordance with g* in expression 7, below:

$$g^* = \underset{g \in \mathcal{G}}{\operatorname{argmin}} \delta\mathcal{R}[f; g] \quad (7)$$

An embodiment, such as process embodiment 1, may additionally involve computing an appropriate step (e.g., iteration) size along g* in expression 8, below:

$$g^* = \underset{\alpha \in \mathbb{R} = \pi r^2}{\operatorname{argmin}} \mathcal{R}[f + \alpha g^*] \quad (8)$$

in which expression 8 may utilize a line search. A boosted predictor may, in an embodiment, thus be updated as:

$$f=f+\alpha^*g^* \quad (9)$$

As provided previously for process embodiment 1, aside from enhanced simplicity over more complex deep CNNs, for example, a potential advantage of boosted multiclass CNNs may include an ability to detect and/or train networks that are potentially capable of providing stronger (e.g., improved) correlations with accurate classifications and to further combine those networks such that, potentially, improved accuracy of a multiclass classifier results.

Figure 1:
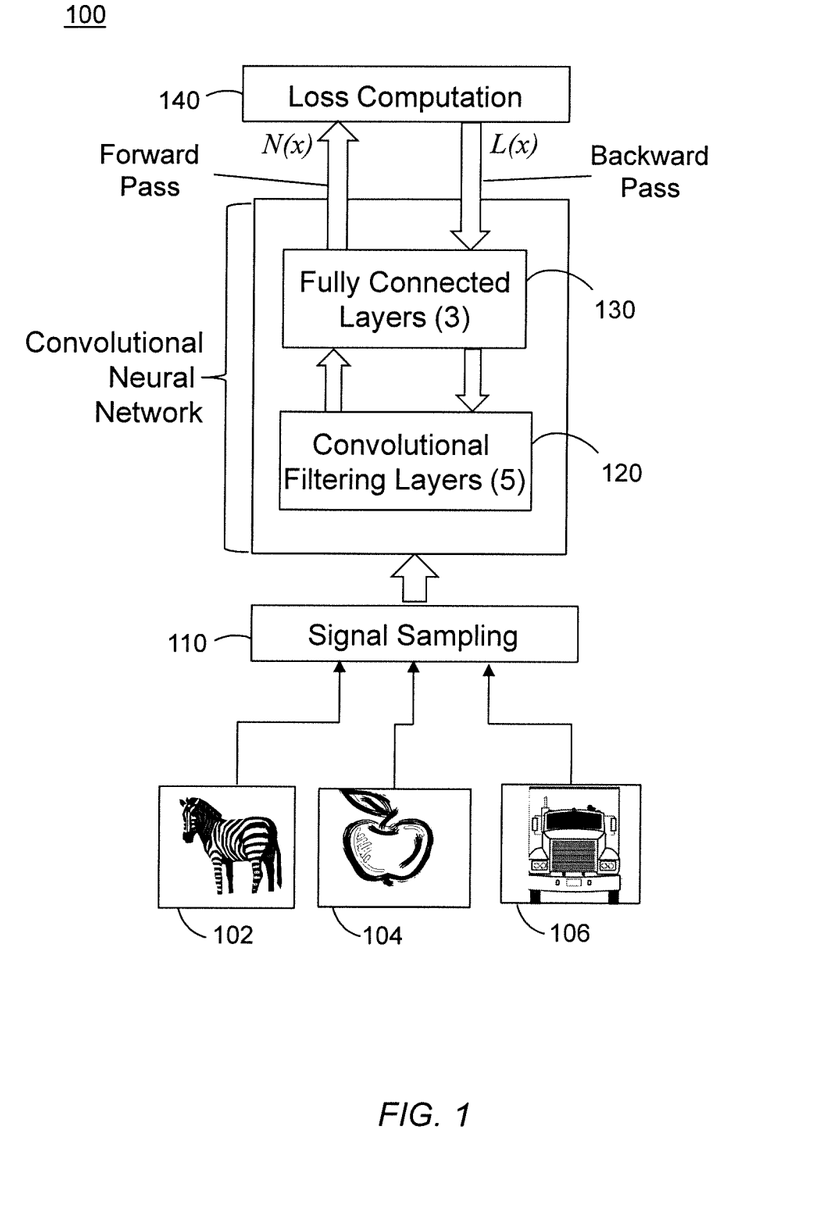
FIG. 1 is a schematic diagram of a deep CNN according to an embodiment.

FIG. 1 is a diagram of a deep CNN according to an embodiment. In the embodiment of FIG. 1, a CNN structure, such as used for M-ary classification, may be modified as described herein. Thus, the CNN structure of FIG. 1, in an embodiment, may begin with one or more of convolutional filtering layers 120 and may end with one or more of fully connected layers 130. In the embodiment of FIG. 1, in a non-limiting example, five convolutional filtering layers may be utilized, followed by three fully-connected layers. An output signal sample value of a final fully connected layer, such as one of fully connected layers 130, may comprise an M-dimensional vector. In embodiments, a $k^{th}$ element in the M-dimensional vector may comprise a confidence parameter and/or score for assigning an input signal sample to a $k^{th}$ class.

Networks, such as shown in FIG. 1 may be trained using a stochastic back-propagation approach, for example. In a stochastic back-propagation approach, layer parameters, such as weights and/or filters, may be initialized utilizing randomized and/or pseudo-randomized values. As shown by block 110, training samples may be prepared by signal sampling and a CNN may compute a prediction, such as N(x), for training samples 102, 104, and 106, as samples are passed from block 110, through the CNN, and to block 140 for computation of loss. Loss computation may evaluate accuracy of N(x) using an objective function, such as a log-likelihood function (e.g., L(x) as shown in FIG. 1) and may back-propagate an update (e.g., feedback) to the network to improve accuracy (e.g., backward pass). This process may be iterated, in an embodiment, until convergence.

Although three training samples (102, 104, and 106) are shown in FIG. 1, some implementations may utilize a much larger number of training samples, which may number into the millions, for example.

However, in embodiments, operations performed by embodiment 100 shown in FIG. 1 may potentially be improved using boosting, which may involve a collection of weak learners that may be aggregated to form an ensemble of boosted deep CNNs. In an embodiment, for implementing a boosted deep CNN, it may be assumed that after t iterations of being boosted, an ensemble of t networks (e.g., networks $\mathcal{N}_1, \ldots, \mathcal{N}_t$) may be trained. Accordingly, a boosted predictor function may be substantially in accordance with expression 10, below:

$$f(x)=\Sigma \mathcal{N}_{t' \in A} \alpha_t \mathcal{N}_t(x) \quad (10)$$

In accordance with process embodiment 1, for example, a suitable network to add to the ensemble in iteration t+1, for example, may comprise a network that reduces expression 5. Learning processes for convolutional networks may be based, at least in part, on reducing an error rate (or loss), via, for example, a log-likelihood function. In embodiments, however, an error rate may be independent of boosting weights and may therefore be distinctly different from the argmin function of expression 7. To train a network to reduce expression 5, a possible approach may be to replace a log-likelihood loss function with a back-propagation process, for example. However, at least in some instances, such an approach may give rise to expression 5 becoming unstable, as a loss function may diverge.

To reduce the possibility of expression 5 invoking an unstable process, it is noted that expression 5 represents a summation of dot products among network output signal samples $\mathcal{N}(x_i)$ and boosting weights $w(x_i)$. Accordingly, expression 5 may measure a similarity between a network output signal sample and a boosting weight. Hence, for an embodiment, a suitable network output signal sample $\mathcal{N}(x_i)$ may be aligned with a boosting weight, such as expressed below:

$$\mathcal{N}(x_i)=\beta w(x_i) \quad (11)$$

in which $\beta>0$, at least in particular embodiments. Note that the exact value of $\beta$ may be unlikely to be of importance since $\mathcal{N}(x)$ may be scaled appropriately by a using expression 8 at a time after a training process. Accordingly, without loss of generality, it can be assumed that $\beta=1$ and an appropriate network output signal sample may replicate boosting weights. In embodiments, replication of boosting weights may be equivalent to training network $\mathcal{N}(x)=[n_1(x), \ldots, n_M(x)] \in \mathbb{R}^M$ by reducing square error loss, such as expressed below:

$$\mathcal{L}_{se}(w,g)=\Sigma_{i=1}^n \Sigma_{j=1}^M (n_j(x_i)-w_j(x_i))^2 \quad (12)$$

Utilizing $\mathcal{L}$ of expression 12, a loss function for learning a CNN, back-propagated derivatives may be expressed as:

$$-\frac{\partial L}{\partial n_k(x_i)} = 2(w_j(x_i)-n_k(x_i)) \quad (13)$$

In accordance with an embodiment, such as process embodiment 1, in an iteration of boosting, a weight, such as a boosting weight of expression 6, may be computed for training signal samples. For the case of a binary classifier, boosting weights may comprise scalar quantities. However, for the case of a multiclass classifier, for example, boosting weights of expression 6 may generally comprise vectors. In accordance with expression 6, weights assigned for a training sample, for example, may reflect accuracy of a classification made by an ensemble of weak learners. To illustrate, if a signal sample is correctly classified, (e.g., $g_{z_i}(x_i) > g_k(x_i)$ $\forall k \neq z_i$) one or more terms in expression 6 may comprise small values relative to other terms of expression 6. Accordingly, reweighing, for an embodiment, permits boosting to train new weak learners on the weaknesses of the current boosted classifier.

In some embodiments, boosting weights may be computed and stored at the start of a boosting iteration. However, in some instances, such as those in which large deep convolutional networks (e.g., an eight-layer CNN) a training set may involve millions of training signal samples comprising of digital images. Moreover, if signal sample augmentation is utilized, (e.g., cropping of digital images, injection of noise into digital images, distortion of digital images, modification of hue and/or color of digital images, or any combination thereof) the training space of signal samples may be increased by, for example, several orders of magnitude. Accordingly, augmentation may give rise to a training sample that may be difficult or impossible to enumerate and/or to compute boosting weights prior to a training iteration and/or bring about other size-related issues.

Figure 2:
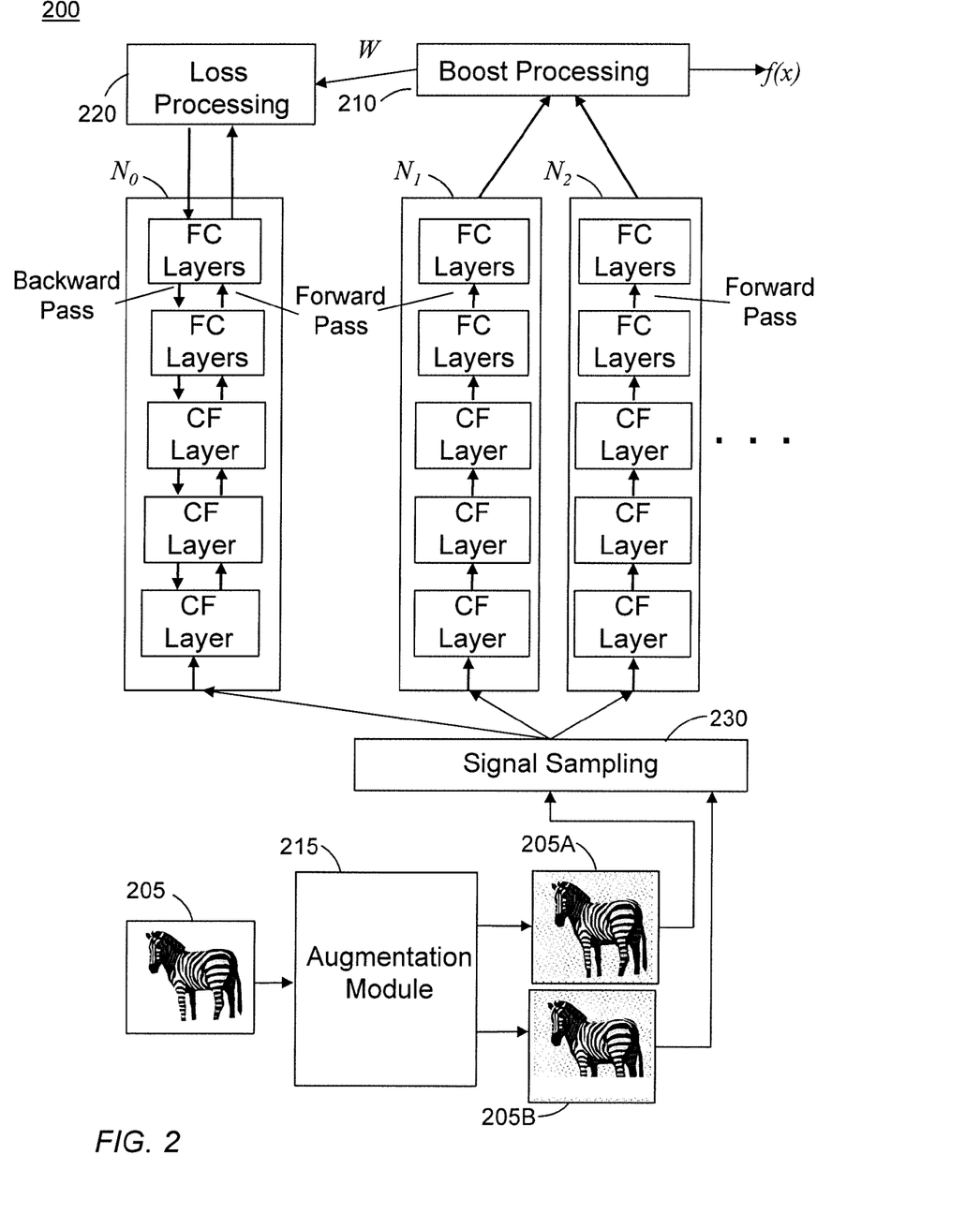
FIG. 2 is a schematic diagram of a deep CNN according to another embodiment.

Accordingly, a boosting CNN, which may permit online (e.g., real-time) computation of boosting weights, such as shown in embodiment 200 of FIG. 2, so as to implement boosting in a form with reduced complexity, reduced training time, and/or a reduction in processing resources in comparison with other approaches of training large, deep convolutional networks. FIG. 2 is a schematic diagram of a deep CNN, which may operate according to an embodiment. In FIG. 2, an auxiliary network ($N_0$) may be utilized to perform forward and backward passes to train one or more additional CNN, such as $N_1$, $N_2$, and so forth, of weak learners. In particular embodiments, training may comprise boosting in which misclassifications made, for example, by a first neural network (e.g., $N_1$) may be utilized to train a second neural network (e.g., $N_2$) and so on. In certain embodiments, particular networks $N_1$, $N_2$, and so forth, may form an ensemble of networks. In some embodiments, networks in an ensemble of networks may be categorized as active, which may imply that a network has been trained (e.g., $N_1$, $N_2$), or inactive, which may imply that a network has not yet been trained (not shown in FIG. 2). As indicated in the embodiment of FIG. 2, active networks (e.g., networks $N_1$, $N_2$) participate in forward passes and do not participate in backward passes.

In FIG. 2, block 210 performs boost signal processing in response to signal samples passing through active CNN, such as $N_1$, $N_2$, and so forth. Thus, output signal samples from active neural networks may be aggregated and a boosted convolutional kernel predictor, such as previously described, for example, may be computed. In embodiments, boost processing may additionally include computing boosting weights (W) and/or estimating $\alpha^*$ using expression 8. Block 220 may utilize boosting weights (W) generated by boost processing in order for block 220 to perform loss processing, which may include computing square error loss ($\mathcal{L}_{se}$) substantially in accordance with expression 12, for example. In the embodiment of FIG. 2, a computed square error loss may permit back-propagation of a derivative of a computed square error loss, as shown in expression 13.

Block 230 may generate signal samples of augmented captured images for various networks, including $N_0$, to receive augmented signal samples in the form of digital images, such as digital images 205A and 205B. As described previously, augmentation of digital images, such as utilizing a processing block 215, may comprise cropping of digital images, injection of random/pseudorandom noise into digital images, distortion of digital images, modification of hue and/or color of digital images, or any combination thereof, so as, for example, to increase size of an available training set of digital images by a factor of approximately in the range of 1000 to 3000. In particular embodiments, augmentation of digital images utilized for training may be performed in a manner to reduce risk of boost processes overfitting a statistical model, as previously mentioned. Networks $N_1$ and $N_2$ may be capable of computing boosting weights in a real-time fashion and supplying boosting weights to auxiliary network $N_0$. At a next training iteration, for example, boosting weights may be provided to additional weak learners, such as $N_3$, $N_4$, $N_5$, etc., (not shown in FIG. 2).

FIG. 2 shows a process embodiment 2 in operation, which may be initiated using an empty set of active networks (A), such as A=0. In forward passes of a $t^{th}$ boosting iteration, a boosting signal process may aggregate output signal samples from active networks (e.g., $N_1$, $N_2$, and so forth) and compute a boosting predictor, substantially in accordance with expression 14:

$$f(x) = \Sigma_{N_t \in A} \alpha_t N_t(x) \tag{14}$$

Pseudocode for a sample process embodiment 2 is provided below:

---
Sample Process Embodiment 2:

Input Signal Sample Values: Number of classes of M, Number of boosting, iterations $N_b$, Number of iterations for learning a convolutional neural network $N_c$, shrinkage parameter v, and signal sample D = {$(x_1,z_1),..., (x_n, z_n)$} in which $z_i \in \{1,...,M\}$ comprises a label of sgnal sample $x_1$.
Initialization: Set A = 0
for t = 1 to $N_b$ do
  for L = 1 to $N_c$ do
    sample a batch of training signal samples.
    Execute a forward pass for networks $N_k \in A$ and $N_0$.
    Compute boosted predictor using expression 14.
    Compute boosting weights, w(x), using expression 6.
    Estimate $\alpha^*$ using current output signal sample of $N_0$.
    Back-propagate 2 (w(x) − N(x)) to $N_0$.
  end for
  set $N_t := N_0$ and add $N_t$ to A.
  set $\alpha_t := v\ \alpha^*$
end for
end for
Output Signal Sample Values: Predictor f(x) = $\Sigma_{t=1} \alpha_t N_t(x)$

---

Using expression 14, boost signal processing may include computing boosting weights substantially according to expression 6, and/or may additionally estimate an appropriate boosting coefficient $\overline{\alpha}^*$ via expression 8 using a current training batch of signal samples in an embodiment. After computing an appropriate boosting coefficient, a square error loss ($\mathcal{L}_{se}$) computation may be performed using boosting weights and output signal samples from auxiliary network $N_0$ to compute derivatives of expression 13, for example, in an embodiment. Derivatives of expression 13 may, in an embodiment, subsequently be back propagated through a CNN. A process embodiment may be iterated until, for example, a square error loss ($\mathcal{L}_{se}$) converges, and N(x) has been trained for an embodiment, for example.

Subsequent to training of N(x), for an embodiment, the network may be copied to, for example, $N_1$, and $N_1$ may be added to an ensemble comprising a set of active networks (A). A boosting coefficient, such as $\alpha^t$, may be updated as $\alpha^t = v\overline{\alpha}^*$ in which $v \in (0, 0.1]$ comprises a shrinkage parameter. In embodiments, a shrinkage parameter, for example, may be effective in bringing about faster convergence.

Returning to expression 6, boosting weights may be, at least in some embodiments, M-dimensional. In embodiments, boosting weights may quantify several aspects of a network. For example, the norm of vector $w(x) \in \mathbb{R}^M$ may be proportional to accuracy with which signal sample x may be classified by a current ensemble of weak learners. If, for example, x is relatively accurately classified, expression $f_{z_i}(x_i)$ may be larger than $f_{y_k}(x_i)$, $\forall k \neq z_i$. Accordingly, terms in the exponent portion of expression 6 may comprise relatively small values, and, therefore, w(x) may have a correspondingly small norm. Conversely, if x appears misclassified, one or more terms of the exponent portion of expression 6 may comprise positive values, and w(x) may therefore comprise a larger norm.

In addition, $k^{th}$ components of vector $w(x) \in \mathbb{R}^M$ may quantify relative importance of the $k^{th}$ class in classification of signal sample $x_i$. Accordingly, for a relatively inaccurate class label, $k \neq z_i$ if $f_k(x_i) > f_z(x_i)$ and $w_k(x)$ may comprise a relatively large value. In addition, $w_k(x)$ may undergo an exponential increase if $f_k(x_i) > f_z(x_i)$. Thus, weights generated responsive to inaccurate classifications may grow exponentially. Likewise, if $f_k(x_i) < f_z(x_i)$, which may indicate more accurate classification, $w_k(x)$ may comprise a relatively small value. Accordingly, in particular embodiments, these weighting approaches, such as those identified in expression 5, may operate to modulate and, therefore, in effect, direct a CNN, for example, towards more challenging signal samples and more problematic classes to be classified.

Furthermore, in an embodiment, addition of a boosted approach may indicate that for a network N, for which $\Sigma_{i=1}^n \Sigma_{j=1}^M N(x_i) w_j(x)$ imposes a non-zero value, may improve classification performance. For example, if N'(x) comprises a network that generates uniformly random output signals:

$$Prob\left(k = \arg\max_{k=1,\ldots,M} N'(x)\right) = \frac{1}{M} \quad (15)$$

Thus, in accordance with expressions 5 and 6:

$$E\{\delta\mathcal{R}[f; N']\} = -\frac{1}{2}\sum_{i=1}^n \sum_{j=1}^M E\{g_j(x_i)\} w_j(x_i) \quad (16)$$

$$E\{\delta\mathcal{R}[f; N']\} = -\frac{1}{2M}\sum_{i=1}^n \sum_{j=1}^M w_j(x_i) = 0$$

Therefore, a network whose generated output is slightly better than random (e.g., a correlation coefficient approximately equal to a value slightly greater than 0.0) may still improve performance. This may be beneficial in reducing trial and error time consumed in designing neural networks. In particular, weak learners may assist, for example, in improving performance. The embodiment of FIG. 2, for example, may comprise a five-layer deep CNN in which three convolutional filtering layers may be augmented by two fully-connected layers just as an example of a non-limiting illustrative embodiment. Nonetheless, the embodiment of FIG. 2, with smaller, less complex neural networks may be trained sequentially, and new neural networks may be trained utilizing mistakes (e.g., inaccurate classifications) of a previous neural network. For example, in the embodiment of FIG. 2, network $N_2$ may be trained (or boosted) utilizing inaccurate classifications performed by network $N_1$. In certain embodiments, sequential training of neural networks may advantageously reduce occurrence of local minima, which may occur for a training process, such as responsive to training a group of CNNs. Accordingly, in comparison with other approaches, such as, for example, approaches utilizing averaging of several independently-trained neural networks, an embodiment in accordance with claimed subject matter may exhibit better performance. Hence, directing training to more problematic signals, as described herein, may improve relative performance.

In an embodiment, an error level of a boosted network may be shown to decrease through addition of, for example, new CNN weak learners. Thus, an axillary network (e.g., $N_0$) of a corresponding boosting iteration may, for example, deemphasize lower-weighted signal samples and focus on improving accuracy of a relatively small and diminishing subset of training signal samples that may be currently misclassified.

Figure 3:
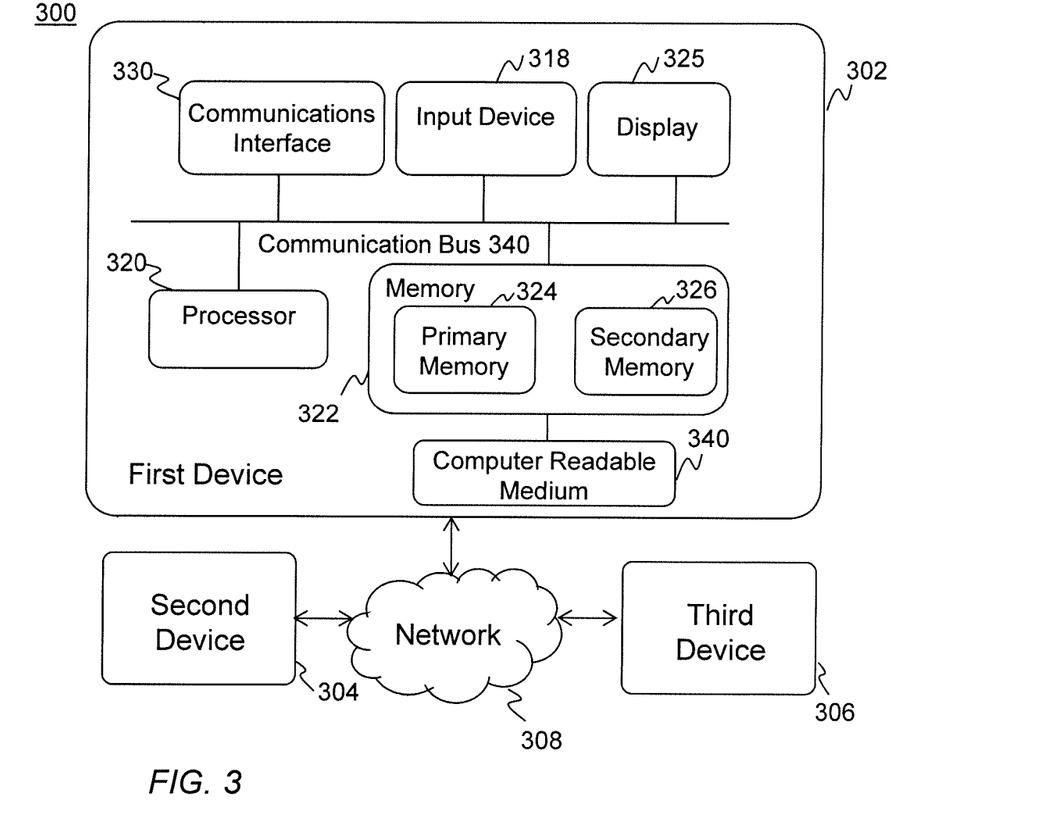
FIG. 3 is an illustration of an embodiment of a system that may be employed in a client-server type interaction to perform boosting of an embodiment of a deep CNN.

FIG. 3 is an illustration of an embodiment of a system 300 that may be employed in a client-server type interaction to perform a boosting of deep CNNs in accordance with an embodiment, such as described infra. In connection with rendering a graphical user interface (GUI) via a device, such as a network device and/or a computing device, for example, computing device 302 ('first device' in figure) may interface with client 304 ('second device' in figure), which may comprise features of a client computing device, for example. Communications interface 330, processor 320, and memory 322, which may comprise primary memory 324 and secondary memory 326, may communicate by way of a communication bus, for example. In FIG. 3, client computing device 302 may represent one or more sources of analog, uncompressed digital, lossless compressed digital, and/or lossy compressed digital formats for content of various types, such as video, imaging, text, audio, etc., in the form physical states and/or signals, for example. Client computing device 302 may communicate with computing device 304 by way of a connection, such as an internet connection, via network 308, for example. Although computing device 302 of FIG. 3 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter to limited in scope to illustrative examples.

Processor 320 may be representative of one or more circuits, such as digital circuits, to execute at least a portion of a computing procedure and/or process. By way of example, but not limitation, processor 320 may comprise one or more processors, such as controllers, microprocessors, microcontrollers, application specific integrated circuits, digital signal processors, programmable logic devices, field programmable gate arrays, the like, or any combination thereof. In implementations, processor 320 may execute signal processing to manipulate signals and/or states, to construct signals and/or states, etc., for example.

Memory 322 may be representative of any storage mechanism. Memory 322 may comprise, for example, primary memory 324 and secondary memory 326, additional memory circuits, mechanisms, or combinations thereof may be used. Memory 322 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 322 may be utilized to store a program. Memory 322 may also comprise a memory controller (not shown in FIG. 3) for accessing computer readable-medium 340 that may carry and/or make accessible content, which may include code, and/or instructions, for example, executable by processor 320 and/or some other unit, such as a controller and/or processor, capable of executing instructions, for example.

Under direction of processor 320, memory, such as memory cells storing physical states, representing, for example, a program, may be executed by processor 320 and generated signals may be transmitted via the Internet, for example. Processor 320 may also receive digitally-encoded signals from client computing device 302.

Network 308 may comprise one or more network communication links, processes, services, applications and/or resources to support exchanging communication signals between a client computing device, such as 302, and computing device 306 (third device' in figure), which may, for example, comprise one or more servers (not shown). By way of example, but not limitation, network 308 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as measurements, text, images, video, audio, etc. in the form of signals and/or states. Thus, a computing device, in this context, may comprise hardware, software, firmware, or any combination thereof (other than software per se). Computing device 302, as depicted in FIG. 3, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) players and/or recorders, game consoles, satellite television receivers, cellular telephones, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 322 may store cookies relating to one or more users and may also comprise a computer-readable medium that may carry and/or make accessible content, including code and/or instructions, for example, executable by processor 320 and/or some other unit, such as a controller and/or processor, capable of executing instructions, for example. A user may make use of input device 318, such as a computer mouse, stylus, track ball, keyboard, and/or any other similar device capable of receiving user actions and/or motions as input signals. Likewise, a user may make use of an output device, such as display 325, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be compliant and/or compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing," "obtaining," "identifying," "selecting," "generating," and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
training a collection of multiclass convolutional neural networks (CNNs) via a boosting process comprising at least one boost iteration to utilize an auxiliary CNN, the auxiliary CNN to form an ensemble with the collection as a linear combination, the linear combination based at least in part on boost prediction error encountered during the training with a subset of the collection.

2. The method of claim 1, and further comprising:
copying the auxiliary CNN and including the auxiliary CNN in the collection on the next boost iteration.

3. The method of claim 2, and further comprising:
executing the boosting until convergence.

4. The method of claim 1, and further comprising:
augmenting a set of signal samples to provide additional signal samples.

5. The method of claim 4, wherein the signal samples are obtained from captured images and wherein the augmenting the set of signal samples comprises cropping, injecting noise, modifying hue, modifying color, distorting, or any combination thereof, one or more of the captured images to form a grouping of the augmented images.

6. The method of claim 1, wherein the training comprises a back-propagating process.

7. The method of claim 6, wherein the back-propagating process comprises back-propagating derivatives of a square error loss function in a backward direction through the collection of CNNs.

8. An apparatus, comprising:
one or more processors to:
train a collection of multiclass convolutional neural networks (CNNs) via a boosting process to comprise at least one boost iteration to utilize an auxiliary CNN, the auxiliary CNN to form an ensemble with the collection as a linear combination, the linear combination based at least in part on boost prediction error to be encountered during the training with a subset of the collection.

9. The apparatus of claim 8, wherein the collection of multiclass CNNs comprise one or more image classifiers.

10. The apparatus of claim 8, wherein the collection of multiclass CNNs comprises one or more deep convolutional networks.

11. The apparatus of claim 8, wherein the one or more processors are additionally to:
aggregate output signal samples of active CNNs and generate boost weights.

12. The apparatus of claim 11, wherein the one or more processors are additionally to:
implement a loss function to utilize the boost weights to compute an indication of square error loss.

13. The apparatus of claim 8, wherein the one or more processors are additionally to:
augment captured images for use as training signal samples to train the collection of multiclass convolutional neural networks.

14. The apparatus of claim 13, wherein the one or more processors are additionally to:
augment the captured images via cropping, noise injection, hue modification, color modification, distortion, or any combination thereof, on one or more of the captured images.

15. An apparatus comprising:
means for generating boost prediction error; and means for training a collection of multiclass convolutional neural networks (CNNs) via an iterative boosting process to utilize an auxiliary CNN, the auxiliary CNN to form an ensemble with the collection as a linear combination, the linear combination based at least in part on means for generating boost prediction error.

16. The apparatus of claim 15, wherein the means for training the collection comprises means for performing regression on the auxiliary CNN.

17. The apparatus of claim 16, wherein the means for performing regression comprises means for back propagating derivatives of a square error loss function.

18. The apparatus of claim 15, and further comprising:
means for copying the auxiliary CNN and including the auxiliary CNN in the collection on the next boost iteration.

19. The apparatus of claim 18, and wherein the means for training the collection of multiclass CNNs includes means for training until convergence.

20. The apparatus of claim 15, wherein the means for training includes means for augmenting training signal samples.

* * * * *